United States Patent [19]

Martino et al.

[11] Patent Number: 5,548,507
[45] Date of Patent: Aug. 20, 1996

[54] LANGUAGE IDENTIFICATION PROCESS USING CODED LANGUAGE WORDS

[75] Inventors: Michael J. Martino, Gardiner; Robert C. Paulsen, Jr., Highland, both of N.Y.

[73] Assignee: International Business Machines Corporation, Armonk, N.Y.

[21] Appl. No.: 212,490

[22] Filed: Mar. 14, 1994

[51] Int. Cl.⁶ .................................................. G06F 17/27
[52] U.S. Cl. .............................. 364/419.01; 364/419.02; 364/419.08
[58] Field of Search ..................... 364/419.01, 419.02, 364/419.08, 419.10, 419.11

[56] References Cited

U.S. PATENT DOCUMENTS

| | | |
|---|---|---|
| 4,058,795 | 11/1977 | Balm . |
| 4,610,025 | 9/1986 | Blum et al. . |
| 4,829,580 | 5/1989 | Church .................................. 381/52 |
| 5,062,143 | 10/1991 | Schmitt . |
| 5,182,708 | 1/1993 | Ejiri . |
| 5,371,807 | 12/1994 | Register et al. .................. 364/419.08 |
| 5,392,419 | 2/1995 | Walton . |
| 5,418,951 | 5/1995 | Damashek . |

FOREIGN PATENT DOCUMENTS

| | | |
|---|---|---|
| 91/02347 | 2/1991 | WIPO . |

*Primary Examiner*—Robert A. Weinhardt
*Attorney, Agent, or Firm*—Bernard M. Goldman

[57] ABSTRACT

Provides a process which identifies the language or genre of a stored or transmitted document. The process uses a plurality of Word Frequency Tables (WFTs) respectively associated with languages/genre of interest. Each WFT contains a relatively few of the most common words of one of the languages of interest. Each word code in a WFT has an associated normalized frequency of occurrence value (NFO); use of NFOs increases the language/genre detection ability of the process. A plurality of respective accumulators are associated with the plurality of WFTs. All accumulators are set to zero before identification processing starts. The language/genre identification process receives a sequence of words from an inputted document, and compares each received word to all of the words in all WFTs. Whenever a received word is found in any WFT, the process adds the word's associated NFO to a current total in the associated accumulator. In this manner, totals in all accumulators build up into language discriminating values after a number of words are read from the document. Processing stops when either the end of the document is reached or when a predetermined number of words are received; and then the language/genre associated with the accumulator containing the largest total is the identified language.

9 Claims, 5 Drawing Sheets

| LANGUAGE NAME | ACCUMULATED WORD FREQUENCIES |
|---|---|
| DANISH | 1376 |
| DUTCH | 1214 |
| ENGLISH | 3787 |
| SPANISH | 17 |
| etc.... | ... |

| DANISH | | DUTCH | | ENGLISH | | SPANISH | | etc. |
|---|---|---|---|---|---|---|---|---|
| WORD | NORMAL-IZED FREQUENCY OF OCCUR-RENCE (NFO) | WORD | NORMAL-IZED FREQUENCY OF OCCUR-RENCE (NFO) | WORD | NORMAL-IZED FREQUENCY OF OCCUR-RENCE (NFO) | WORD | NORMAL-IZED FREQUENCY OF OCCUR-RENCE (NFO) | |
| I | 100.0 | DE | 100.0 | THE | 100.0 | DE | 100.0 | ... |
| OG | 83.5 | VAN | 53.9 | OF | 52.0 | EL | 82.2 | ... |
| AT | 49.5 | EEN | 37.3 | AND | 41.2 | LA | 69.8 | ... |
| TIL | 49.4 | HET | 35.7 | TO | 37.4 | Y | 46.0 | ... |
| ER | 46.0 | IN | 35.5 | A | 33.2 | A | 43.2 | ... |
| EN | 42.1 | EN | 30.7 | IN | 30.5 | EN | 38.0 | ... |
| DET | 41.7 | IS | 17.6 | THAT | 15.1 | EL | 36.4 | ... |
| AF | 40.4 | TE | 16.4 | IS | 14.4 | QUE | 28.7 | ... |
| etc. | ... | | | ... | | ... | ... | ... |

FIG.3

LANGUAGE IDENTIFICATION PROCESS USING CODED LANGUAGE WORDS

FIELD OF THE INVENTION

The subject invention relates generally to human language recognition technology, and particularly to a machine process for identifying the language used in a computerized document.

BACKGROUND

Computer networks have proliferated the transmission of coded documents between people with different languages. When electronic mail is sent across national boundaries, computer system operations may need to be interrupted for human intervention to determine the language of a received document before its machine processing (selecting, displaying, printing, etc.) can continue. This invention eliminates the need for such human intervention by automatically determining the correct language alphabet in which to print, display, etc. the document when using computer recorded codes representing its text to allow the machine processes to continue without interruption through the language identification process.

COMPARISON TO PRIOR ART

Prior art in the area of automated language identification of coded text is limited to n-gram character based systems (e.g. U.S. Pat. Nos. 4,829,580 to Church and 5,062,143 to Schmitt), which handle each character multiple times, as opposed to the word-based technique used by the subject invention in which each character in a coded text is, at most, handled only once and most characters in large documents need not be handled at all.

Language identification cannot be done by prior signal recognition systems (e g U.S. Pat. No. 4,610,025 to Blum and PCT application WO 91/02347), which use language and speech characteristics that require large amounts of text to be parsed and measured, and large amounts of time for processing.

Prior computer-based language identification systems for identifying the language of a coded document are based on some form of matching algorithm based on language statistics that are related to or derived from the language, and typically use an algorithm which is not meaningful in a linguistic context. Attention may be directed to the following U.S. Patents for illustration of such prior systems: Schmitt, "Trigram-Based Method of Language Identification" U.S. Pat. No. 5,062,143 and Church, "Text Analysis System With Letter Sequence Recognition and Speech Stress Assignment Arrangement" U.S. Pat. No. 4,829,580.

Prior systems using trigrams, n-grams, and other artificial divisions in a computerized text are not considered reliable, and they are very slow and costly of computer time, because they handle each character multiple times for a document, e.g. each document character appears in three different trigrams. Characteristics measured, or derived from, but which are not actual components of written languages (such as trigrams or letter sequences), have limited success in identifying the correct language, and require large amounts of text to be parsed and measured, and large amounts of time for this processing.

Similarly, prior systems which depend on the attributes of individual characters and their local contexts are also limited when applied to the problem of identifying a language. For example, U.S. Pat. No. 4,058,795 to Balm entitled "Method and Apparatus for Context-Aided Recognition" may be useful in determining a word in a known language, but it is not suited to the problem of identifying the language in which the word is written.

Thus, the subject invention does not use the prior art techniques which variously classify language by examining selected characteristics of a signal waveform or language trigrams, n-grams, or other such artificial divisions of written language. Other attempts at system identification of languages have been based on various characteristics of speech signals are not useful since code-represented text does not have speech signals. Even for signals derived from the human voice, most languages share a significant number of sounds, making speech signals difficult to use for language identification. Added to this difficulty is the waveform processing requirement which tends to limit such approaches due to cost and complexity.

SUMMARY OF THE INVENTION

The subject invention provides a process for a machine determination of the language or genre used in a computer coded document.

In this specification, the term "language" means a natural language (i.e. human language) used for human communications (e.g. English, French, Spanish, German, etc.). The invention also applies to "genre" within a natural language. Genre is defined herein as a distinctive style of use of a language in some specific context. For example, genre within English includes technical writing, business writing, legal writing, fiction, and many others. Thus, genre applies to different variations of the same language involving different styles and manners of word use within a natural language which are reflected in coded documents, and may involve a distinctive use of standard words in a language or may add new words to a language. Genre may reflect particular jargons and dialects of a language such as High German, Low German, and Swiss German, or as London English and New York English.

The technique used by this invention reads word codes from a document and compares these word codes to predetermined lists of words selected from a plurality of languages or genre of interest. The language or genre of the document is identified by a process that determines which language's word-list most closely matches the words in the document. Closeness of match is weighted by the frequency of occurrence of listed words in each language or genre of interest.

Each language's or genre's word-list with the associated frequency of occurrence for each word in the list is referred to herein as a Word Frequency Table (WFT).

Each Word Frequency Table contains words from one language or genre and preferably contains relatively few words. The most common words in a language/genre are used in each table since, statistically, a significant percentage of all words in any document will be the most common words used in its language. That this is so is intuitive. Each of the words in each table has an associated statistically-determined value for the word's frequency of occurrence in the language or genre associated with the table.

The language/genre detection process associates each word frequency table with a respective accumulator. Initially, all accumulators are set to zero before recognition processing starts for identifying the language in a coded document.

The process reads a sequence of words from an inputted document having its language/genre identified. Each read word is compared to the common words in all tables. Whenever a read word is found to be equal to a word in any table, the process adds the word's Normalized Frequency Occurrence (NFO, as found in that table) to the current sum in the accumulator associated with the respective language. In this manner, values in the accumulators build up into language discriminating values during processing of the document's coded text characters.

When processing stops, the identified language/genre is the language/genre associated with the highest-valued accumulator. Processing may stop either by reaching the end of the document or by achieving a predetermined confidence in the accumulated discrimination. This is more fully described below.

As described, the mechanism can be seen to apply for any language or genre using an alphabet without regard to the printed symbols used for that language since all such symbols are processed as binary codes in a computer machine, and not as human readable symbols.

Ideographic languages such as Japanese, Chinese, Korean, and the Kangi languages for example, can be handled by this invention in a computer mechanism by choosing an appropriate internally-coded representation for the ideographs, such as the double-byte codes used for such languages in computers today. Thus, the mechanism of this invention can be applied to any language having coded words, without regard to the alphabet or word form required for the human-readable printed symbols used for the respective languages. This allows the invention to be used to recognize both alphabetic and ideographic languages by choosing an appropriate internally-coded representation for the words and ideographs.

The speed of language determination by this invention is very fast, because only a relatively small number of words need to be read from any document to reliably determine its language or genre.

Further, a unique advantage of the present invention is that only a few words (such as 50) need by contained in the Word Frequency Table for each language of interest, so that in practice each read word needs to be compared with only a relatively small number of words to suffice for reliable language recognition.

The use of NFOs by this invention aids in discriminating among words which may appear in more than one language. Use of NFOs increases the language detection ability of the mechanism, because of their normalization of the frequency of occurrence for the words in each table. The different NFO values for the same coded word in different languages (summed in the respective accumulators) differently affect the language-discrimination sums being accumulated. For example, "que" is a common word in both French and Spanish, but it has a larger NFO in the Spanish language. So counting the occurrences of "que" in a document will sum greater in the Spanish accumulator than in the French accumulator.

It should therefore be apparent that these different NFO values for "que" in the Spanish and French language sets are more effective than merely using a process that increments by one the current values in the Spanish and French accumulators each time the word "que" is read.

Use of NFOs (instead of simple occurrence counts) is especially important when this invention is used to distinguish between different genre of the same language. For example, one may wish to determine if a document is a "business" versus "technical" document. Unique word tables would be required for each genre and would-likely contain many the same words but differ in the NFO values for those words.

The frequency of occurrence of words in different languages can be obtained from a number of different publications. For example, see the FREQUENCY DICTIONARY OF FRENCH WORDS, authored by A. Juilland, D. Brodin and C. Davidovitch, Mouton, The Hague, Mouton, 1970, in the series, The Romance Languages and Their Structures. The most frequently occurring word in French is "le" and its measured frequency is 38,585 (page 387). Que, according to the same source has, in French, a measured frequency of 9,570 (page 387).

Similarly, in the FREQUENCY DICTIONARY OF SPANISH WORDS, in the same series of books, The Romance Languages and Their Structures, the most-frequently occurring word in Spanish is "de" and its measured frequency is 35,144 (page 385). Que, according to the Spanish frequency dictionary has a measured frequency of occurrence of 7,518 (page 385).

Other language data are found in I DANSKE AVISER, Ugeblade og Fagblade, av B. Maegaard og Hanne Ruus, Gyldendal, Copenhagen, 1986 (Danish), WORDFREQUENTIES IN GESCHREVEN EN GESPROKEN NEDERLANDS, P. C. Uit den Boogaart, Oosthoek, Scheltema & Holkema, Utrecht, 1975, (Dutch) A WORD-FREQUENCY DICTIONARY OF POLISH JOURNALISTIC TEXTS, F. E. Knowles, Dept. of Modern Languages, University of Aston, Birmingham, U.K., 1981 (Monograph), FREQUENCY DICTIONARY OF CHINESE WORDS, E. S. Liu, Mouton, The Hague, 1973, and EIN FREQUENZWOERTERBUCH DER DEUTSCHEN ZEITUNGSSPRACHE, I. Rosengren, CWK Gleerup Lund, Schweden. (Swedish) And this list is not exhaustive, but rather shows the breadth of languages for which the required frequency counts are readily available.

The data for Table 1 are taken from Computational Analysis of Present-day American English by H. Ducera and W. N. Francis and published by the Brown University Press, Providence, R.I., 1967. Similar books have been published for essentially all major languages. Some of these books for the major languages of the world include, in addition to the ones listed earlier, FREQUENCY DICTIONARY OF ITALIAN WORDS, authored by A. Juilland, et al, The Hague, Mouton 1973, in the series, The Romance Languages and Their Structures, HYPPIGE ORD.

An example is the NFO for "le" of 100=((100*38585/38585)) in French, and the NFO for "que" is 24.8=(100*(9570/38585)) in French.

In Spanish, the NFO for "de" is 100=(100*(35144/35144)), and the NFO for "que" is 21.4=(100*(7518/35144)).

From these calculations of the NFO for the single word "que", it can be seen that, in examining computerized documents respectively written in French and Spanish, the probability of a document containing "que" in French is 24.8/(21.4+24.8)=0.537, and the probability of a document containing "que" in Spanish is 21.4/(21.4+24.8)=0.463. But the language-identification probability greatly increases for a language when a significant number of common words are examined in a document, and all of their NFOs are accumulated for the respective languages. Then, the language associated with the accumulator having the largest accumulated sum is the identified language for the document.

Therefore, if all the words read from a document provide the highest value in the French accumulator, the probability that the document is written in French is so great that it can be reliably used.

Table 1 below demonstrates why relatively few words are required to be in a Word Frequency Table. It lists the twelve most common words in written English in MEASURED FREQUENCY order from top to bottom. The MEASURED FREQUENCY is stated as the average count for each common word per 100 words used in the (written) English language, determined over the total word count in a very large number of English documents. It is therefore the percentage of cases that a word randomly selected from a representative sample of written English text will be that particular word. (MEASURED FREQUENCY is equivalent to frequency of occurrence, as that term has been previously used herein.) Each CUMULATIVE FREQUENCY in Table 1 is the sum of the MEASURED FREQUENCIES for all words in the table from that point and above. For example, the CUMULATIVE FREQUENCY of 20.307 is shown with the word "in" in TABLE 1 and represents a plurality of common words comprising the six most frequently used words in the English language (i.e. the first six words: "the", "of", "and", "to", "a", and "in" in Table 1). The CUMULATIVE FREQUENCY of 20.307 is therefore derived by adding the MEASURED FREQUENCIES for these six words. Thus, in a representative sample of written English text, approximately 20% of the words in the text will be one of the first six words in Table 1; fully 26% will be one of the 12 words in the table. Thus, relatively few words represent a substantial portion of representative text. Similar tables showing similar statistics can be constructed for other languages.

TABLE 1

The Twelve Most Common English Words

| WORD | MEASURED FREQUENCY | CUMULATIVE FREQUENCY |
|---|---|---|
| the | 6.899 | 6.899 |
| of | 3.590 | 10.489 |
| and | 2.845 | 13.334 |
| to | 2.578 | 15.912 |
| a | 2.291 | 18.203 |
| in | 2.104 | 20.307 |
| that | 1.045 | 21.352 |
| was | 0.995 | 22.347 |
| he | 0.968 | 23.315 |
| for | 0.941 | 24.256 |
| it | 0.936 | 25.192 |
| with | 0.863 | 26.055 |

Experiments have shown that after about 100 words are read from a document being examined to determine its human language, the identification of the correct language is essentially assured by the highest sum of NFOs in the accumulators for the candidate languages. It is preferable that several hundred words be read from a document (unless it is a very short document) to conclude that the language identification is assured with a high degree of confidence. For short documents, the language assurance is less, but generally is sufficient.

Language statistics, such as those shown above in Table 1, show that the words which are most common in a language are the most useful in making a language identification. There are several reasons for this: First, the definition of a common word in a language is that it is a word that is used frequently in that language. As a result, common words from a language will appear in essentially all written communication; hence the process of this invention will find them. (As an aside, cryptographers have known for a long time that common words can provide an opponent with an entry into a code or cipher. In certain situation then, messages are encoded or enciphered avoiding the common words. This fact provides an independent confirmation of the usefulness of common words in the determination of the language of a document.)

It can be argued that uncommon words are actually a better discriminator among languages and while true, it is not a particularity useful observation. For example, "undoubtedly" occurs only (so far as is known to the inventors) in English, and hence may be taken as an absolute indication that a document containing it is written in English. However, the word "undoubtedly" occurs so infrequently, as to be of no value in discriminating among languages. Using large tables of uncommon words will increase discrimination (either alone or in combination with common words). Uncommon word tables for languages of interest are intended to be included in the concept of this invention, so that if all the words in a given document are found in a table of uncommon words of one language, L, it is assured that the document is written in language L.

While a number of words are common in different languages, such as "que", in Spanish and French and "in" which is common in Dutch, English, German and Italian, when the normalized frequencies of occurrence are computed for the different languages, the values differ. That this is so can be seen from Table 2, and can be understood from noting that the word "in", while spelled the same in the standard alphabet, has different meanings and may have differences among the languages, in meaning, part of speech, usage and so on. "Que", for example, in French is most commonly used as a conjunction whereas in Spanish, the most common usage is as a pronoun.

TABLE 2

Normalized Frequency of the Word "IN" for Several Languages

| LANGUAGE | NORMALIZED FREQUENCY OF "IN" |
|---|---|
| Dutch | 35.54 |
| German | 47.55 |
| English | 30.50 |
| Italian | 39.87 |

The overall effect of these language statistics is that an examination of about 100 words form a document in an unknown language using the method of the present invention with the 50 most common words in each of the candidate languages and their normalized frequencies of occurrence is ordinarily sufficient to estimate the language of the document accurately.

In fact, in many instances, fewer than 100 words need to be examined and still smaller word sets can be used. For example, 25 most common words with their NFO's will often yield a satisfactory result. Some difficulty may be experienced with very short messages. However this is no different from what a skilled linguist is confronted with when asked in which language the message, "Die." written. Lacking any contextual clues or other words, the best guess is German as die has a very high frequency of occurrence in German, but Dutch and English are also candidate languages.

BRIEF DESCRIPTION OF THE DRAWINGS

FIG. 3 is an example of Word Frequency Tables (WFTs) respectively containing a set of common words with associated fields containing Normalized Frequencies of Occurrence (NFOs) for a plurality of languages of interest.

DESCRIPTION OF THE DETAILED EMBODIMENT

The preferred embodiment of the present invention is the combination of a novel programming executing in a conventional data processing system. Alternatively, the invention may be embodied in special data processing hardware (not shown) which has separate comparator controls for operating with tables embedded in special storage hardware.

Figures 1, 4:
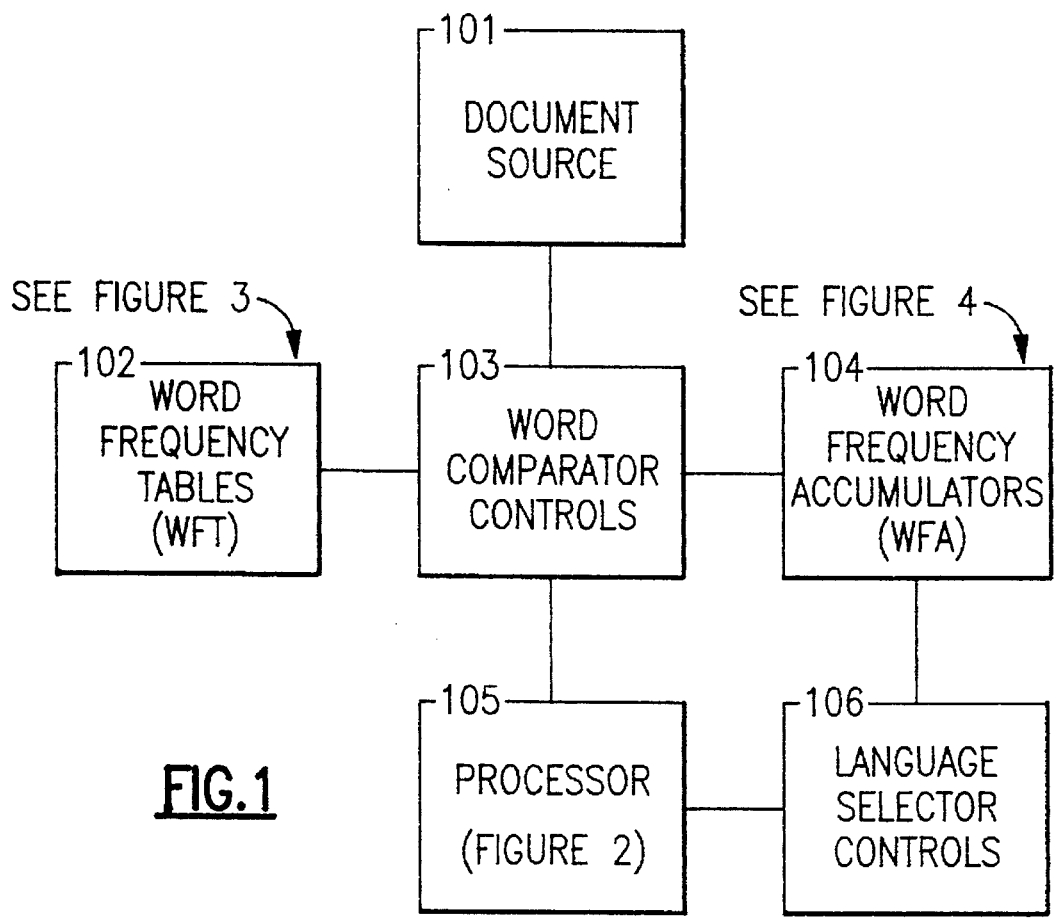
FIG. 1 is a functional block diagram of the current invention, a general data processing system containing data and controls for determining the language of a document.
FIG. 4 is an example of Word Frequency Accumulators (WFAs) respectively associated with the WFTs in FIG. 3.

FIG. 1 shows an overall block diagram of a general system configuration supporting an embodiment of the invention. It contains components which may be formed of hardware/software components in the system.

Document Source 101

Coded data input is provided from a Document Source 101, which provides coded characters representing text of a document generated by using words of any human language. Document source 101 may be provided by an optical character reader reading the coded characters from a hard copy of a document. Alternatively, source 101 may be coded characters read from a soft copy of a document stored in an internal storage (e.g. RAM, floppy disk, tape or compact disk) of the system, or source 101 may be coded characters transmitted on a network to the data processing system from some remote location using a similar system reading the document from one of its terminals or peripheral devices.

Processor 105 and Word Comparator 103

The text from the source 101 is provided in variable-length word units to processor comparator controls 103, which are part of a processor 105. Comparator controls 103 compare each variable length word received from source 101 with each word in a plurality of language Word Frequency Tables 102.

Word Frequency Tables (WFT) 102.

Each of the Word Frequency Tables 102 is associated with a respective language which can be detected as the language of source document 101. The set of particular languages represented by tables 102 are called herein the languages of interest, and a language not represented in tables 102 cannot be detected as the language of document source 101.

The Word Frequency Table for a language or genre of interest may be generated by the following process:

1. Counting the occurrence of each word in a large number of text documents for a language or genre to find the most commonly-used words which are selected and written in a list with their associated occurrence count;

2. Determining a frequency of occurrence for each word in the list by dividing the word's occurrence count by the total number of words examined in all documents by step 1 and replacing the occurrence count with the calculated frequency of occurrence;

3. Reducing the size of each word-list by selecting the N number of words in the list having the highest frequency of occurrence count (in practice 25 to 100 words in a list is sufficient for language discrimination, with more required for genre discrimination);

4. Normalizing the frequency of occurrence for each word in the word-list by dividing the word's frequency of occurrence by the highest frequency of occurrence (designating the most-used word), or by dividing by the sum of all frequency of occurrence counts, in the respective word-list. Either of these methods obtains normalized-frequency of occurrence (NFO) values. The NFOs may be further adjusted by multiplying all NFO values by a common factor to achieve a more convenient scale (for example making the most-frequent word's NFO value be 100);

5. Using the selected words (step 3) and the associated NFO for each word (step 4) to comprise the Word Frequency Table for the language or genre.

Thus, each of the Word Frequency Tables 102 contains a set of the most frequently used words in a specific language or genre and values for the respective frequency of occurrence of each word in the language associated with that frequency table.

Thus, in the example of FIG. 3, the most common word in each of the languages of interest has its NFO value set to 100 for each language, and the NFOs of the other common words in each table is less than 100.

The use of NFOs, instead of "measured frequencies" in the WFTs significantly improves the language identification ability of the process, for the reasons given in the Summary of Invention section in this specification.

The word frequencies for the words in each language or genre of interest may alternatively be determined (instead of using the source documents previously listed herein) by having a data processing system count the words in a large number of documents in an environment in which the invention is to be used. This approach may be more useful than using the listed sources when the particular environment mixes jargon, or colloquialisms, in one or more of the languages of interest, which often occurs, or if one is attempting to distinguish different genre in the same language.

As a variation on the basic invention, any of Word Frequency Tables 102 may also contain a sampling of words unique to the same language or genre which may have a relatively low frequency of use in the language of the respective table. Each of the common words in tables 102 has an associated frequency value, as described above. However, each of the unique words in the tables 102 has an artificial frequency value that is large in comparison to the frequency values of the common words. For example, a value twice that of the most common word may be used. Use of unique words is especially helpful in distinguishing between genre.

Each word received from document source 101 is compared by comparator 103 with the words in tables 102. Comparator 103 determines an equal or unequal condition between each inputted document source word and each table word read from tables 102. The words in each of the plurality of tables 102 may be scanned until all words in all of tables 102 are compared by comparator 103.

Whenever a word in any Word Frequency Table 102 is found to compare equal with a source document word, the frequency value associated with the table word is read out by processor 105. Then, that frequency value is transferred by processor 105 to a language-associated accumulator (of a plurality of accumulators 104) which is the accumulator associated with the language of the table having the current word with the compare-equal condition and called a Word Frequency Accumulator (WFA). Each frequency value received by an associated Word Frequency Accumulator 104 is added to (accumulated with) whatever sum currently exists in the respective accumulator.

The compare processing stops when the source words stop being inputted. This may occur when the document source 101 reaches the end of the current document or reaches a predetermined number of words, or when (after some minimum number of words are supplied by the document source 101) one the highest-valued accumulator 104 exceeds the next highest-valued accumulator 104 by a predetermined amount or factor. See discussion of step 205, below, for details of this.

After the compare processing stops for a document source 101, language-selector controls 106 are operated by the processor 105. The language-selector controls 106 access all accumulated values in all accumulators 105 and determines which accumulator contains the highest value.

The language associated with the accumulator containing the highest value is outputted by controls 106 as the identified language.

Word Frequency Accumulators 104

A plurality of Word Frequency Accumulators (WFAs) 105 are respectively associated with each language's WFT. That is, each language has an associated WFT and an associated WFA.

Thus, a WFT/WFA pair is thereby provided for each language of interest. The associated language is recorded with each WFA and each WFT. Examples of WFAs are represented in FIG. 4, which are respectively associated with the WFTs in FIG. 3. All of the WFAs are reset to a zero value by initialization step 402 prior to inputting words from a document source 101 to the process in FIG. 1 or 2.

During processing, each WFA contains a running total of the NFOs of the common words in the source document which match (compare-equal with) a common word in the associated WFT (for the same language). For each match of a word in the source document with a word in any of the WFT, the normalized frequency of occurrence for that word is added to the total for that language in the associated WFA.

Hence, each WFA sums the NFOs for inputted words having matches in the associated WFT. A match occurs when a source word from an inputted document is found equal to a word in the associated WFT, causing the NFO of that word to be sent to, and summed in, its associated WFA. After reading is ended for an inputted document, the language assigned to the WFA having the highest value of all WFAs is thereby declared by the process as the identified language of the document.

Figure 2:
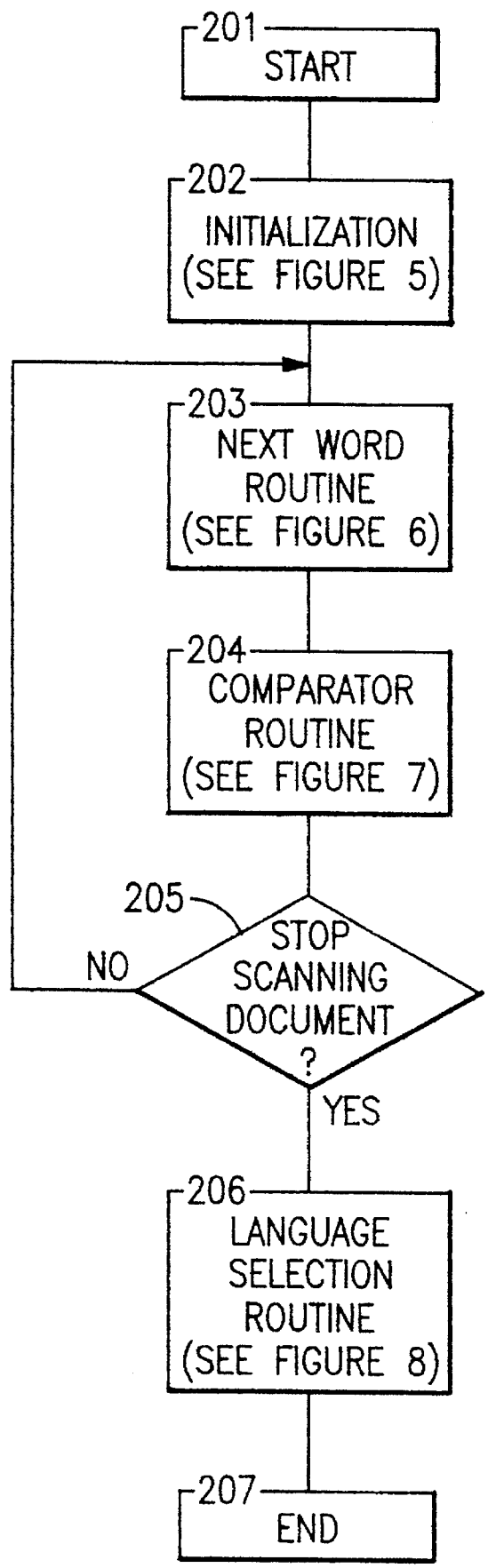
FIG. 2 is a flow chart of sequence of general steps carried out in the process performed by the system shown in FIG. 1. Detailed steps within each of these general steps are shown in FIGS. 5, 6, 7 and 8.

Process in FIG. 2

The process in the flow chart of FIG. 2 shows the general sequence of steps by which a document is processed and its language determined. The process is described here without reference to the use of unique words (the variation discussed above) because the process is the same in either case, the difference being confined to the construction of the Word Frequency Tables as described above.

Each of steps 202, 203, 204 and 206 represents a sub-process, which is expanded into a sequence of sub-steps respectively represented in FIGS. 5, 6, 7 and 8. Each of these steps operates under control of a processor in the data processing system.

General step 202 provides initialization of a data processing system for executing the invention using WFTs and WFAs for the languages of interest. Step 202 loads the WFTs and WFAs into the system main memory from a storage medium, on which they were stored after they were previously prepared, and their addresses in main memory is passed to the process in FIG. 2 for use in its execution. Step 203 obtains the first word and a sequence of following words from the source document which is having its language determined and transfers each word to step 204. The first word need not be the actual first word in the source document, and it may be located anywhere in the source document, and it is generally the first text word after any non-text data in the source document. Non-text data will generally be skipped in the sequence of data provided to the process in FIG. 2.

Step 204 compares each source word with all of the common words in all WFTs and reads out the NFOs associated with each common word getting a match (compare-equal condition). Step 204 adds each readout NFO to the current sum in the WFA associated with the WFT having the readout.

Step 205 determines when to stop processing a document. This may be when any of the following conditions are detected:

1. The entire document is read and all words compared to the Word Frequency Tables. This may be determined by recognizing an end-of-document signal, by knowing the size of the document and tracking the amount of text processed, by sensing that a time has expired during which no input has been received as an indication of the end of a document, or by relying on the data processing system's file-processing subsystem to report end-of-file.

2. A predetermined number of words from the document have been processed. It has been found that only a hundred words or so may be needed from a document to identify its language. Thus, all words in a large document need not be read and processed by the subject invention. Hence, the invention may use a predetermined number N for the number of words required to be read for language or genre needing the most number of words for identification.

3. After some minimum number of words are processed, a predetermined factor (or, alternatively, difference) between the highest-valued and the next-highest-valued accumulator is achieved. It has been found that once the accumulators diverge it is extremely unlikely that additional processing will result in the then-highest-valued accumulator being exceeded by another accumulator when the entire document is processed.

Step 206 is entered after the end of document is sensed by step 205. Step 206 compares the values in all of the WFAs and finds the WFA having the largest value. Step 206 outputs the language-name content of the language field associated with the WFA having the largest value to determine the identified language.

Figure 5:
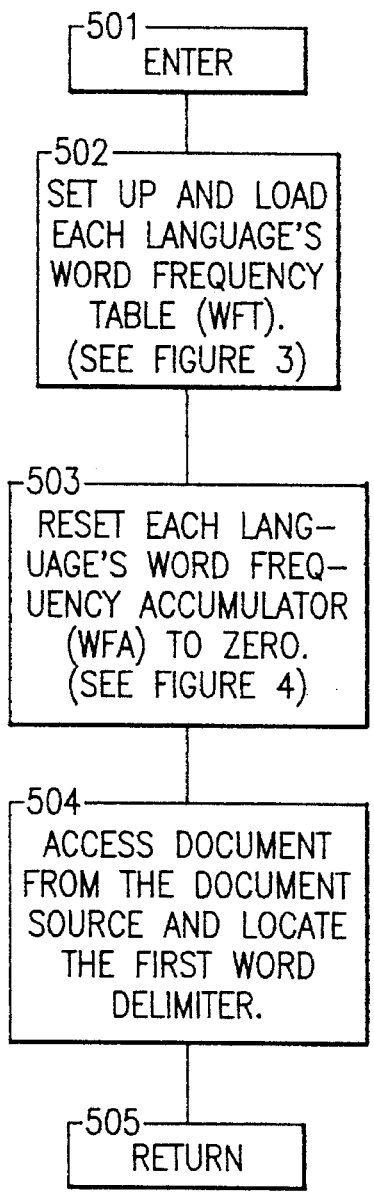
FIG. 5 is a flow chart of detailed initialization steps executed within step 202 in FIG. 2.

Detailed Steps in FIG. 5 for Process 202

FIG. 5 shows steps for the initialization process 202 in FIG. 2, which is entered when the process in FIG. 2 is started. Thus, in FIG. 5, step 501 is entered from step 201 in FIG. 2. Step 502 sets up and loads into the main storage of the data processing system the WFT and WFA for each language of interest to be used in the execution by the process of FIG. 2. Preferably, the WFTs and WFAs were previously prepared and stored on a disk device in the manner discussed above in this specification. Hence, step 502 loads the WFTs and WFAs from the disk device into a main storage of a data processing system and sets up their main storage addresses within software for the process in FIG. 2, in the manner done by conventional software initialization processes.

After step 502 is completed, step 503 sets the contents in all WFA accumulators to a zero state. Then, step 504 accesses the input source document and locates and reads its first word. Each word in a coded document is delineated by conventional word delimiters. Such delimiters are primarily "blank" characters, but also include the comma (,), semicolon (;), period (.), question mark (?), and other punctuation marks in each of the languages of interest.

Figure 6:
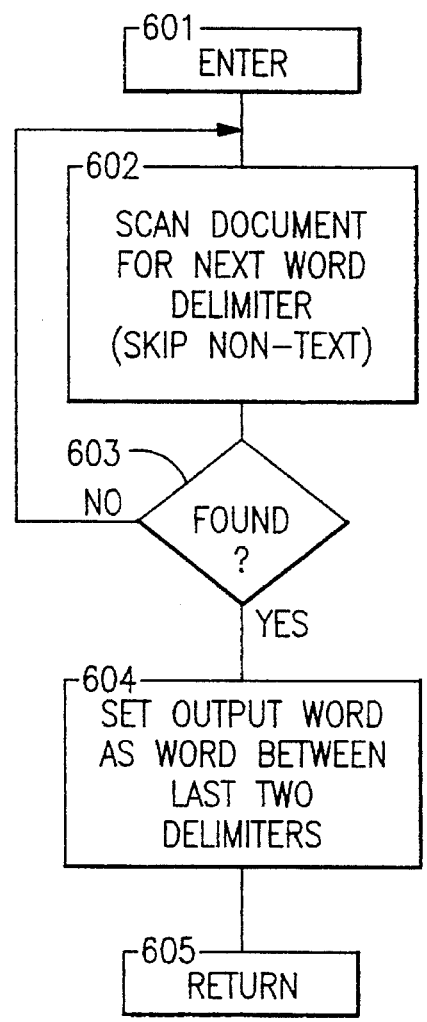
FIG. 6 is a flow chart of detailed steps executed within step 203 of FIG. 2 in a next word sub-process for locating the words in a document having its language being determined.

The initialization operation in FIG. 6 may then end at step 505 with a return to the main-line process in FIG. 2, in which step 203 is entered.

Detailed Steps in FIG. 6 for Process 203 of FIG. 2

Step 203 in FIG. 2 is executed by entering step 601 in FIG. 6. Then step 602 is invoked to scan the characters received from the document in order to delineate its words, which are needed by the process of this invention. Each next source word is determined by detecting a next word delimiter (which initially is just prior to the beginning of first word in the source document), which is detected by step 603.

As the characters are received, they are stored into a word buffer W and the storing of characters stops momentarily when the next word delimiter is detected, to define the next word in buffer W; this word is then referred to herein as the "current word". The process in FIG. 6 defines one current word at a time from the source document, and then step 605 returns to the main-line process in FIG. 2 by entering step 204.

The effect of this delimiter processing is to parse the source document into its words and present each source word to the comparator process 204 in FIG. 2 (which is shown in more detail in FIG. 6).

Figure 7:
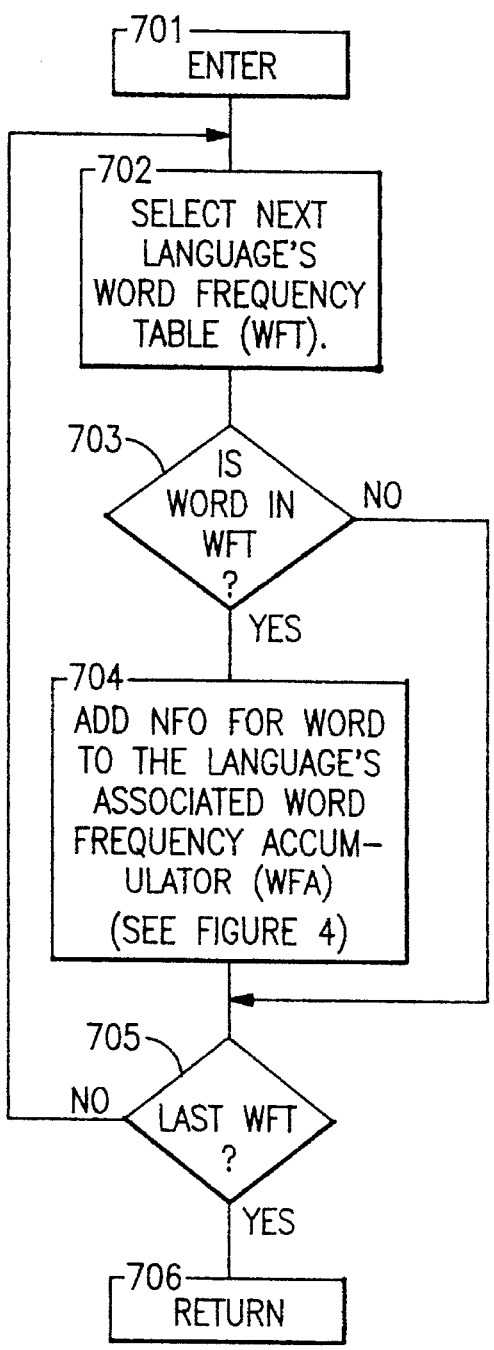
FIG. 7 is a flow chart of detailed steps executed within step 204 of FIG. 2 in a comparator sub-process for identifying common words in a document and reading their NFOs into their associated WFAs of the languages of interest.

Detailed Steps in FIG. 7 for Process 204 of FIG. 2

The process in FIG. 7 receives each current word from buffer W and compares it with each common word in all WFTs, beginning with a first selected WFT in the set of WFTs (which represent all of the languages of interest).

Step 702 starts by selecting the first WFT in the set which can be any of the WFTs in the set. Then the WFTs can be selected in any order until all are compared to the received source word. Thus, step 702 may select, for example in FIG. 3, the Danish WFT as the first WFT.

Step 703 then compares the current word with the common words in the WFT to determine if the current word is present in that language's table. If the current word is not in that table, the no exit is taken from step 703 to step 705 which indicates if the current WFT is the last WFT to be examined in the set. If this WFT is not the last in the set of WFTs, the no exit is taken from step 705 back to step 702, which then selects the next WFT in the set for a next iteration through the sub-process in FIG. 7.

If step 703 finds a compare-equal condition, then the yes exit is taken to step 704 which accesses the NFO with the WFT word having the hit and adds that NFO to the current sum in the associated WFA for that language. Then, step 705 is entered to test if the current WFT is the last. If not the last, the no exit is taken to step 702, and another iteration through the process in FIG. 7 is taken until all WFTs are compared to the same source word.

The effect of the process in FIG. 7 is to generate for all of the languages of interest, running NFO totals in the WFAs for hit source words.

When the last WFT in the set is compared, step 705 takes its yes exit to step 706 which returns the process operations to step 205 in the main-line process in FIG. 2 to determine if the current source word is the last word to be examined in the source document.

Thus, the current source word may not be found in any WFT, or it may be found by step 703 to be in one or more WFTs for one or more of the languages of interest, whereby its NFO may be added to the contents of one or more WFAs.

Figure 8:
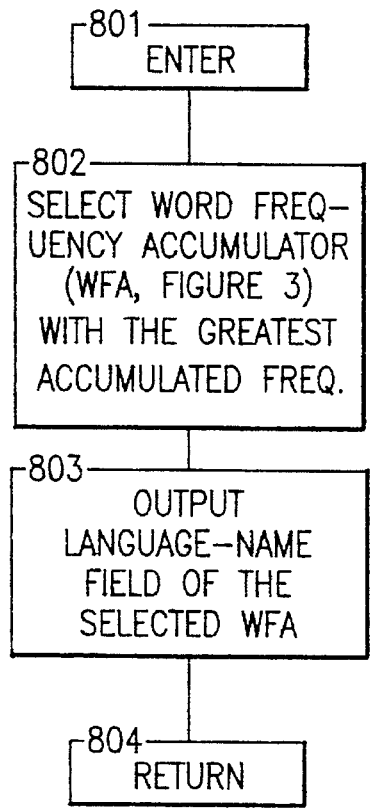
FIG. 8 is a flow chart of detailed steps within step 206 of FIG. 2 for a language selection sub-process which identifies the human language of a source document based on the highest sum of the NFOs in any WFA.

Detailed Steps in FIG. 8 for Process 206 of FIG. 2

Step 206 selects the language associated with the WFA having the largest total, which is thereby identified as the language of the source document. The processing for step 206 begins by entering step 801, which goes to step 802 to measure all of the values in the WFAs to determine the largest value. When step 802 determines the largest value in all of the WFAs, step 803 is executed to access the language-name field associated with the WFA containing the highest value, and the language name content of that field is outputted to indicate the identified language for the current source document. The process in FIG. 8 is then complete, and its next step is taken to return to the main-line process in FIG. 2, which then ends with its last step 208.

If a next source document exist, the process in FIG. 2 is repeated for determining its language.

While particular embodiment have been shown and described, it is to be understood that this invention is not intended to be limited to this description but is susceptible to numerous changes and modifications as would be known to one skilled in the art and therefore there is no intention to be limited to the details shown herein but rather the intent is to cover all such changes and modifications as are obvious to one skilled in the art.

Having thus described our invention, what we claim as new and desire to secure by Letters Patent is:

1. A machine process for identifying a human language used in a computer coded document from text in the document, comprising the steps of reading a sequence of words from the document, comparing each word obtained by the reading step to words in a plurality of Word Frequency Tables (WFTs) respectively associated with languages of interest, each WFT containing a set of most frequently used words in an associated language, and each word in a WFT having an associated numerical value representing a previously determined frequency of occurrence (FO) value for the word in a sample of documents written in the associated language, associating a Word frequency Accumulator (WFA) with each WFT, and resetting each WFA to a predetermined WFA value prior to reading each document by the reading step, outputting the FO value associated with each word matched by the comparing step with a word read by the reading step, inputting each FO value provided by the outputting step to the associated WFA, adding each FO value to a current sum contained in the associated WFA to generate an accumulated amount, detecting which of the plural WFAs has the largest accumulated amount, and identifying the human language associated with the WFA detected to have the largest accumulated value.

2. A machine process for identifying a human language used in a computer coded document from text in the document as defined in claim 1, further comprising the steps of finding the largest FO value of all words in each WFT, normalizing the FO value for each WFT by dividing each FO value by the largest FO value found in the WFT to generate a normalized frequency of occurrence (NFO) for the word, and replacing each FO value with the NFO value determined by the normalizing step.

3. A machine process for identifying a human language used in a computer coded document from text in the document as defined in claim 2, further comprising the steps of inserting one or more special words in any WFT which are not in the other WFTs, each non-special word in each WFT being also found in at least one other WFT, and storing an FO value for each special word larger than the FO value of any non-special word in the WFT.

4. A machine process for identifying a human language used in a computer coded document from text in the document as defined in claim 3, further comprising the steps of comparing each word in WFT with words in each of the other WFTs to find each special word and each non-special word in each WFT, and assigning a larger FO value to each special word found by the comparing step than the FO value provided for any non-special word in the WFT.

5. A machine process for identifying a human language used in a computer coded document from text in the document as defined in claim 2, further comprising the steps of generating a word frequency table (WFT) by reading a plurality of sampled documents known to be in a language of interest for which the WFT is to be generated, counting number of occurrances for each word read in the sampled documents by the generating step to establish a FO value associated with each word in the WFT, and retaining in the WFT language the words having associated FO values exceeding a threshold, and the WFTs each having approximately the same total value for all FOs in each WFT.

6. A machine process for identifying a human language used in a computer coded document from text in the document as defined in claim 5, further comprising the steps of setting the threshold for a minimum number of words which must be read from a document before a language identification can be made, counting the words read from the document, and making a language identification only if the count exceeds the threshold.

7. A machine process for identifying a human language used in a computer coded document from text in the document as defined in claim 6, further comprising the steps of setting the threshold for a largest WFA value which can identify a language, and identifying the language of the document when the largest WFA value exceeds the next-largest WFA value by more than an established threshold and the word count exceeds the threshold.

8. A machine process for identifying a human language used in a computer coded document from text in the document, as defined in claim 5, further comprising the steps of generating any WFT to represent a genre within a language instead of, or in addition to, representing the language by a WFT, and establishing the FO values associated with words in the WFT from word frequencies in a sampling of documents representing the genre.

9. A machine process for identifying a human language used in a computer coded document from text in the document as defined in claim 1, further comprising the steps of establishing an established range of word-lengths defined as the count of letters in each word as an initial step, determining a word-length for each word by counting the letters in each word in each WFT, comparing the word-length for each word with the established range, and removing from the WFT any word and its associated FO value when word-length is not within the established range.

* * * * *